US010582582B2

(12) United States Patent
Broers et al.

(10) Patent No.: US 10,582,582 B2
(45) Date of Patent: Mar. 3, 2020

(54) PITCH ILLUMINATION

(71) Applicant: SIGNIFY HOLDING B.V., Eindhoven (NL)

(72) Inventors: Harry Broers, S-Hertogenbosch (NL); Willem Peter Van Der Brug, Best (NL); Ruben Rajagopalan, Neuss (DE)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/096,647

(22) PCT Filed: May 15, 2017

(86) PCT No.: PCT/EP2017/061599
§ 371 (c)(1),
(2) Date: Oct. 25, 2018

(87) PCT Pub. No.: WO2017/198610
PCT Pub. Date: Nov. 23, 2017

(65) Prior Publication Data
US 2019/0166668 A1 May 30, 2019

(30) Foreign Application Priority Data
May 19, 2016 (EP) .................... 16170400

(51) Int. Cl.
H05B 37/02 (2006.01)
H05B 33/08 (2020.01)
F21W 131/105 (2006.01)

(52) U.S. Cl.
CPC ..... H05B 33/0845 (2013.01); H05B 33/0821 (2013.01); H05B 37/0227 (2013.01); F21W 2131/105 (2013.01)

(58) Field of Classification Search
CPC ........ G06K 9/4604; G06T 7/70; H04N 7/183; F21W 2131/105; H05B 37/0227; H05B 33/0821; H05B 33/0845
(Continued)

(56) References Cited

U.S. PATENT DOCUMENTS 4,941,662 A 7/1990 Deperna
5,401,018 A 3/1995 Kelly et al.
(Continued)

FOREIGN PATENT DOCUMENTS

CN 102639925 A 8/2012
CN 104704291 A 6/2015
(Continued)

OTHER PUBLICATIONS

International Illumunance Services.http://www.i-i-s.eu/project-analysis.html.

Primary Examiner — Douglas W Owens
Assistant Examiner — Amy X Yang
(74) Attorney, Agent, or Firm — Daniel J. Piotrowski

(57) ABSTRACT

A control system for a stadium lighting system comprising a plurality of luminaires installed within the stadium to illuminate a pitch within the stadium in accordance with a light plan containing aiming information for each luminaire is disclosed. The control system comprises a data storage device storing the light plan and a controller communicatively coupled to the data storage device, the controller being responsive to object tracking information for an object travelling across the pitch. The controller is adapted to determine a direction of travel of the object from the object tracking information; evaluate the aiming information for each luminaire to identify if at least one luminaire is arranged to generate a luminous output in an aiming direction coinciding with said direction of travel; and generate a
(Continued)

dimming level adjustment signal for the at least one identified luminaire to reduce the intensity of said luminous output. A stadium lighting system including such a control system, a method of controlling such a stadium lighting system and a computer program product for implement such a method are also disclosed.

15 Claims, 7 Drawing Sheets

(58) Field of Classification Search
USPC .................................. 315/291, 151–158, 76
See application file for complete search history.

(56) References Cited

U.S. PATENT DOCUMENTS

| | | | |
|---|---|---|---|
| 5,730,521 A | 3/1998 | Spink et al. | |
| 6,152,126 A | 11/2000 | Smith et al. | |
| 7,458,700 B2 | 12/2008 | Gordin | |
| 8,952,628 B1 * | 2/2015 | Gordin | H05B 37/0227 |
| | | | 315/291 |
| 9,706,622 B2 * | 7/2017 | Gordin | H05B 37/0218 |
| 10,337,680 B1 * | 7/2019 | Gordin | F21S 8/081 |
| 2015/0334807 A1 | 11/2015 | Gordin et al. | |
| 2017/0205061 A1 * | 7/2017 | Broers | H05B 37/0227 |

FOREIGN PATENT DOCUMENTS

| | | |
|---|---|---|
| EP | 2982901 A1 | 2/2016 |
| WO | 2009004539 A1 | 1/2009 |
| WO | 2014174412 A2 | 10/2014 |
| WO | 2015175818 A1 | 11/2015 |

* cited by examiner

PITCH ILLUMINATION

CROSS-REFERENCE TO PRIOR APPLICATIONS

This application is the U.S. National Phase application under 35 U.S.C. § 371 of International Application No. PCT/EP2017/061599, filed on May 15, 2017 which claims the benefit of European Patent Application No. 16170400.2, filed on May 19, 2016. These applications are hereby incorporated by reference herein.

FIELD OF THE INVENTION

The present invention relates to a control system for a stadium lighting system comprising a plurality of luminaires installed within the stadium to illuminate a pitch within the stadium in accordance with a light plan containing aiming information for each luminaire, the control system comprising a data storage device storing the light plan.

The present invention further relates to a stadium lighting system including such a control system.

The present invention further relates to a method of controlling such a stadium lighting system.

The present invention further relates to a computer program product for implementing this method on the control system.

BACKGROUND OF THE INVENTION

Many sports events take place in the evening or night for commercial reasons. Such events can draw larger audiences, both within a stadium in which the event is hosted and remote attendance through media, e.g. televised, broadcasts. To facilitate such sports events at such times of day, the arena or stadium in which the sports event takes place is typically artificially illuminated by a stadium lighting system in which a plurality of luminaires are aimed at different locations of the pitch to achieve a desired illumination profile across the pitch, e.g. a substantially homogeneous illumination of the pitch area. To this end, the luminaires are typically distributed across the stadium, e.g. positioned in support frames mounted on masts in the corners of the stadium or individually mounted along the stands and seating areas of the stadium and aimed at a specific location of the pitch as specified in a so-called light plan. Such a light plan can specify the stadium location in which the luminaire is to be mounted and an aiming direction or pitch location at which the luminaire is to be aimed at the pitch such that an installer can correctly install the luminaires by consultation of the light plan.

However, hosting such sports events under artificial lighting is not without problems. In particular, the players on the pitch may experience glare when looking into a luminaire directed at a pitch location in which the player is present. In order to reduce the risk of such glare, a luminaire may include light shaping elements such as reflectors and lenses that are shaped to reduce direct lamp glare. An example of such a luminaire is disclosed in U.S. Pat. No. 5,730,521.

However, even when using such luminaire designs, it is difficult to avoid glare altogether, e.g. when a player directly looks into a luminaire. Such glare may interfere with the player's ability to intercept a moving object such as a ball and may therefore compromise the quality and/or fairness of the sports event. For example, a player in a ballgame such as football, soccer, baseball, basketball, tennis, cricket and so on may be unable to control or catch a ball having a trajectory such that the ball approaches the player along a trajectory that coincides with an aiming direction of one or more of the luminaires of the stadium lighting system, which may cause glare for the player. Hence, there exists a need to further reduce glare for sportsmen on a pitch.

SUMMARY OF THE INVENTION

The present invention seeks to provide a control system for a stadium lighting system that dynamically reduces glare for the sports people on the pitch of the stadium.

The present invention further seeks to provide a stadium lighting system including such a control system.

The present invention further seeks to provide a method of controlling a stadium lighting system in order to dynamically reduce glare for the sports people on the pitch of the stadium.

The present invention further seeks to provide a computer program product for implementing this method on the control system.

According to an aspect, there is provided control system for a stadium lighting system comprising a plurality of luminaires installed within the stadium to illuminate a pitch within the stadium in accordance with a light plan containing aiming information for each luminaire, the control system comprising a data storage device storing the light plan; a controller communicatively coupled to the data storage device, the controller being responsive to object tracking information for an object travelling across the pitch, wherein the controller is adapted to determine a direction of travel of the object from the object tracking information; evaluate the aiming information for each luminaire to identify if at least one luminaire is arranged to generate a luminous output in an aiming direction coinciding with said direction of travel; and generate a dimming level adjustment signal for the at least one identified luminaire to reduce the intensity of said luminous output; wherein the controller may be adapted to determine an angle between the direction of travel and an aiming direction of the luminaire and compare the determined angle against an angle threshold to identify if at least one luminaire is arranged to generate a luminous output in an aiming direction coinciding with said direction of travel.

Nowadays, many sports stadiums have object tracking systems installed for tracking the movement of an object, e.g. a ball, across the pitch of the stadium, for example to assist an umpire or referee in reaching a correct decision. Such object tracking systems routinely provide object position and direction information relative to the pitch, i.e. a trajectory of the object. The present invention is based on the insight that such object trajectory information may be compared against the aiming information of the luminaires as specified in the light plan of the stadium lighting system, which comparison may yield one or more luminaires having an aiming direction corresponding to the direction of travel of the object. As the object is mostly travelling in a direction towards a player, in most scenarios this implies that the player intended to receive the object has an increased risk of being blinded by the identified one or more luminaires having the aiming direction corresponding to the direction of travel of the object, such that the identified one or more luminaires may be controlled with a dimming adjustment signal that temporarily reduces the intensity of the luminous output of these luminaires, thereby reducing the risk of the receiving player being subjected to glare.

As mentioned before: In assessing whether at least one luminaire is arranged to generate a luminous output in an aiming direction coinciding with said direction of travel, the controller may be adapted to determine an angle between the direction of travel and an aiming direction of the luminaire and compare the determined angle against an angle threshold to identify if at least one luminaire is arranged to generate a luminous output in an aiming direction coinciding with said direction of travel. In this manner, the controller may identify luminaires that have an aiming direction that is similar enough to the direction of travel of the object, i.e. having an aiming direction under an angle with the direction of travel below a defined angle threshold.

The controller may be further adapted to predict a pitch destination region for the object from the object tracking information; and evaluate the aiming information for each luminaire to identify at least one luminaire arranged to generate a luminous output in an aiming direction coinciding with said direction of travel and having an aiming target in a pitch location in the pitch destination region in order to extrapolate the likely target destination of the travelling object, i.e. the target location of the recipient of the object.

The controller may be adapted to predict the pitch destination region in response to determining that the height of the object relative to the pitch exceeds a defined further height threshold, said further height threshold being larger than the height threshold. For example, the controller may be adapted to predict a time of arrival of the object in the pitch destination region; and generate the dimming level adjustment signal for the at least one identified luminaire in accordance with the predicted time of arrival. If the object such as a ball travels above a certain further height, this may be indicative of the object having been intended to travel over a relatively large distance, e.g. towards a goalkeeper or the like, which means that the object may travel over the distance for a relatively large period of time, e.g. several seconds. In such a scenario, it may be desirable to predict the time of arrival of the object in the pitch destination region such that the dimming adjustment signal for the relevant luminaires may be generated in accordance with the predicted time of arrival, e.g. shortly before the time of arrival, to optimize the illumination conditions for the recipient of the object in the predicted pitch destination region.

In an embodiment, the controller is further adapted to evaluate the aiming information for each luminaire to identify at least one further luminaire arranged to generate a luminous output in an aiming direction different to said direction of travel and having an aiming target in a pitch location in the pitch destination region; and generate a further dimming level adjustment signal for the at least one identified further luminaire Such a further luminaire for example may be controlled to temporarily increase its luminous output intensity during the temporary decrease of the luminous output intensity of the at least one luminaire potentially causing glare to ensure that a lux level in the pitch destination region remains at a relatively constant level. This for example may be desirable in televised sports events, where a viewer may be distracted or may have his or her viewing pleasure compromised by noticeable changes in the lux levels across the pitch caused by the temporarily reduction of the intensity of the luminous output of one or more of the luminaires of the stadium lighting system in order to reduce the risk of the players on the pitch exhibiting glare as explained above.

The controller may be further adapted to estimate an amount of glare for said pitch destination region from the aiming information in said light plan; and generate the dimming level adjustment signal for the at least one identified luminaire if said estimated amount of glare exceeds a defined glare threshold. In this embodiment, the controller only generates a dimming adjustment level signal if it is determined that for a particular pitch destination region there is a realistic risk of glare occurring, thereby reducing the risk of unnecessary luminaire dimming.

According to another aspect, there is provided a stadium lighting system comprising a plurality of luminaires for mounting in a stadium in accordance with a light plan containing aiming information for each luminaire; and the control system of any of the above embodiments arranged to control said luminaires. Such a stadium lighting system benefits from the dynamic glare reduction measures provided by the control system and is therefore particularly suited for illumination of a pitch on which a sport event including a travelling object, e.g. a ball.

The luminaires may be LED luminaires Such luminaires can be particularly bright, and therefore particularly benefit from the dynamic glare reduction measures provided by the control system. In addition, the response of a LED to a change in dimming level instruction is virtually instantaneous, which make LED luminaires particularly suitable for use in embodiments of the present invention.

According to yet another aspect, there is provided a method of controlling a stadium lighting system comprising a plurality of luminaires installed within the stadium to illuminate a pitch within the stadium in accordance with a light plan containing aiming information for each luminaire, the method comprising receiving object tracking information for an object travelling across the pitch; determining a direction of travel of the object from the object tracking information; accessing the light plan to evaluate the aiming information for each luminaire and identify if at least one luminaire is arranged to generate a luminous output in an aiming direction coinciding with said direction of travel; and generating a dimming level adjustment signal for the at least one identified luminaire to reduce the intensity of said luminous output. Such a method therefore effectively reduces glare experienced by a person on the pitch towards whom the object is travelling.

The method may further comprise predicting a target pitch destination region for the object from the object tracking information; and evaluating the aiming information for each luminaire to identify at least one luminaire arranged to generate a luminous output in an aiming direction coinciding with said direction of travel and having an aiming target in a pitch location in the target pitch destination region.

In an embodiment, the method further comprises predicting a time of arrival of the object in the target pitch destination region; and generating the dimming level adjustment signal for the at least one identified luminaire in accordance with the predicted time of arrival to minimize the amount of time during which the luminous output of the one or more identified luminaires is dimmed, thereby minimizing the potential distraction of such dimming by the spectators.

The method may further comprise evaluating the aiming information for each luminaire to identify at least one further luminaire arranged to generate a luminous output in an aiming direction different to said direction of travel and having an aiming target in a pitch location in the target pitch destination region; and generating a further dimming level adjustment signal for the at least one identified further luminaire. Such a further dimming level adjustment signal for example may increase the luminous intensity of the luminous output produced by the at least one identified further luminaire, e.g. in order to maintain a relatively constant lux level across the target pitch destination region.

In an embodiment, the method further comprises estimating an amount of glare for said pitch destination region from the aiming information in said light plan; and generating the dimming level adjustment signal for the at least one identified luminaire if said estimated amount of glare exceeds a defined glare threshold. This has the advantage that a luminaire output is only adjusted if there is an increased likelihood that its unadjusted luminous output would cause glare.

According to yet another aspect, there is provided a computer program product comprising a computer readable storage medium having computer readable program instructions embodied therewith for, when executed on the controller of the control system of any of the above embodiments, cause the controller to implement the steps of the method of any of the above embodiments. Such a computer program product therefore facilitates the upgrading of existing control systems without the need to replace the control system hardware with new hardware capable of implementing such dynamic glare reduction measures.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
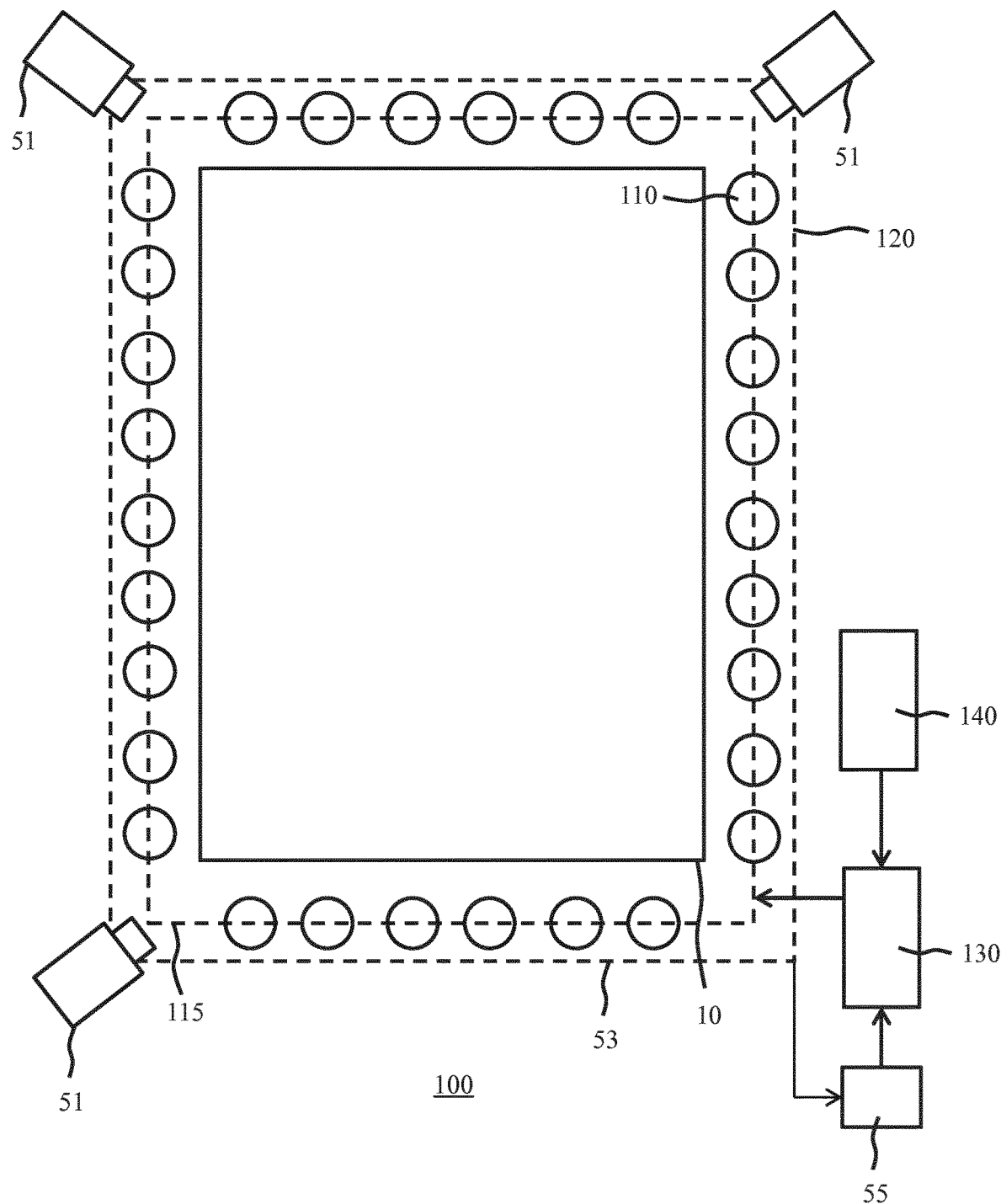
FIG. 1 schematically depicts a stadium lighting system according to an embodiment.

It should be understood that the Figures are merely schematic and are not drawn to scale. It should also be understood that the same reference numerals are used throughout the Figures to indicate the same or similar parts.

FIG. 1 schematically depicts a lighting system 100 for generating a predefined illumination pattern on a pitch 10 of a sports arena or stadium. In the context of the present invention, the pitch 10 may be any area onto which a sport is played where players track a moving object such as a ball, a shuttle cock, a Frisbee, a clay pigeon, a javelin, a discus, and so on, such as a grass pitch, a track, a field, a course, and so on. The sports arena may be a permanent indoor or outdoor stadium or arena, or may be a temporary stadium, e.g. temporarily erected stands around a pitch, e.g. a football field, baseball pitch, golf course or the like.

The lighting system 100 comprises a plurality of luminaires 110 for mounting relative to the pitch 10 such that the luminaires 110 can be aimed at the pitch 10 in order to generate the predefined illumination pattern. For example, in case of a sports arena, the luminaires 110 may be mounted around the pitch 10 in order to achieve the predefined illumination pattern. For example, the luminaires 110 may be mounted in dedicated mounting frames to be positioned in selected positions of the sports arena, e.g. in proximity to corners of the pitch 10, in which case each mounting frame may include a mast for elevating the mounting frame to a desired height in order to achieve pitch illumination under suitable illumination angles. A particularly common alternative arrangement is where the luminaires 110 are mounted on e.g. the roofs of the stands and seating areas around the pitch 10, wherein the luminaires 110 may be mounted on different tiers of the spectator areas to achieve pitch illumination under a range of illumination angles. This for instance is advantageous when trying to achieve uniform or homogeneous illumination of a pitch region under different viewing angles, e.g. from different camera positions for capturing sports action on the pitch 10 for broadcasting purposes, where the illumination requirements may be more easily achieved when illuminating a pitch region from multiple illumination angles.

Figure 2:
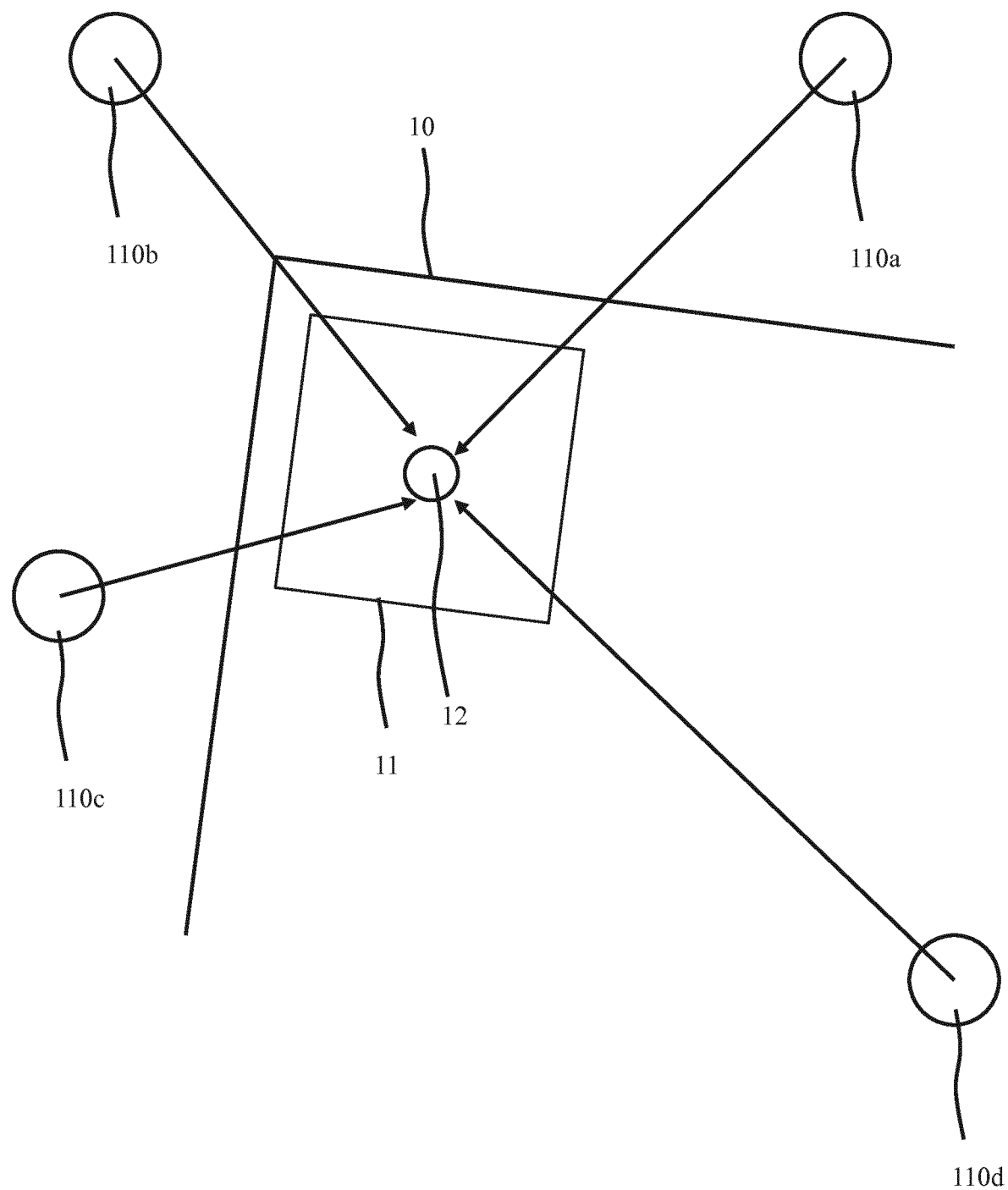
FIG. 2 schematically depicts a typical aiming arrangement of such a stadium lighting system.

The luminaires 110 may be any suitable type of luminaire, e.g. a LED-based luminaire such as a LED-based flood light or the like. The luminaires 110 are typically aimed at dedicated aiming locations on the pitch 10 based on a so-called light plan, which specifies how the respective luminaires 110 should be aimed at the pitch 10 to achieve the desired illumination of the pitch 10, as previously explained. As schematically depicted in FIG. 2, an area 11 of the pitch 10 is typically illuminated by multiple luminaires 110a-d from multiple directions to ensure that the area 11 is sufficiently observable from multiple viewing angles, e.g. to spectators in different locations within the stadium or by cameras aimed at the area 11 from different angles, and to avoid the formation of shading on the area 11. The luminaires 110a-d may be mounted in different regions of the stadium, e.g. in different corners of the stadium, on different parts of a tier of the stadium, on different tiers of the stadium, and so on in order to achieve such a multi-angle illumination of the area 11. For example, each of the luminaires 110a-d may have an aiming target 12 specified in the light plan within the area 11. This may be the same aiming target for each of these luminaires or maybe different aiming targets to create partially overlapping luminous profiles in the area 11 that combine to achieve the desired illumination of this area.

A designer of a light plan will typically aim the various luminaires 110 at respective aiming targets 12 across the pitch 10 to achieve a desired luminous distribution across the pitch 10 that allows spectators and TV viewers to follow an event on the pitch 10 such as a sports match whilst at the same time trying to avoid players or other persons on the pitch 10 to experience glare caused by the luminaires 110. Such a designer will typically try and achieve this by careful selection of the aiming targets 12 for the various luminaires 110, which may be supplemented by specifying dimming levels for the various luminaires 110 to achieve the desired luminous distribution across the pitch 10. To this end, the luminaires 110 may be communicatively coupled to a controller 130 by a communication link 120, which may be a dedicated wired or wireless link or alternatively may be a bus structure to which the luminaires 110 are communicatively connected. Such communication links are well-known per se and are therefore not explained in further detail for the sake of brevity only. It suffices to say that any suitable communication link 120 may be used for this purpose. The controller 130 is typically adapted to send dimming level adjustment signals to the respective luminaires 110 over the communication link 120 between the controller 130 and the luminaire 110. The controller 130 will be explained in further detail below.

Figure 3:
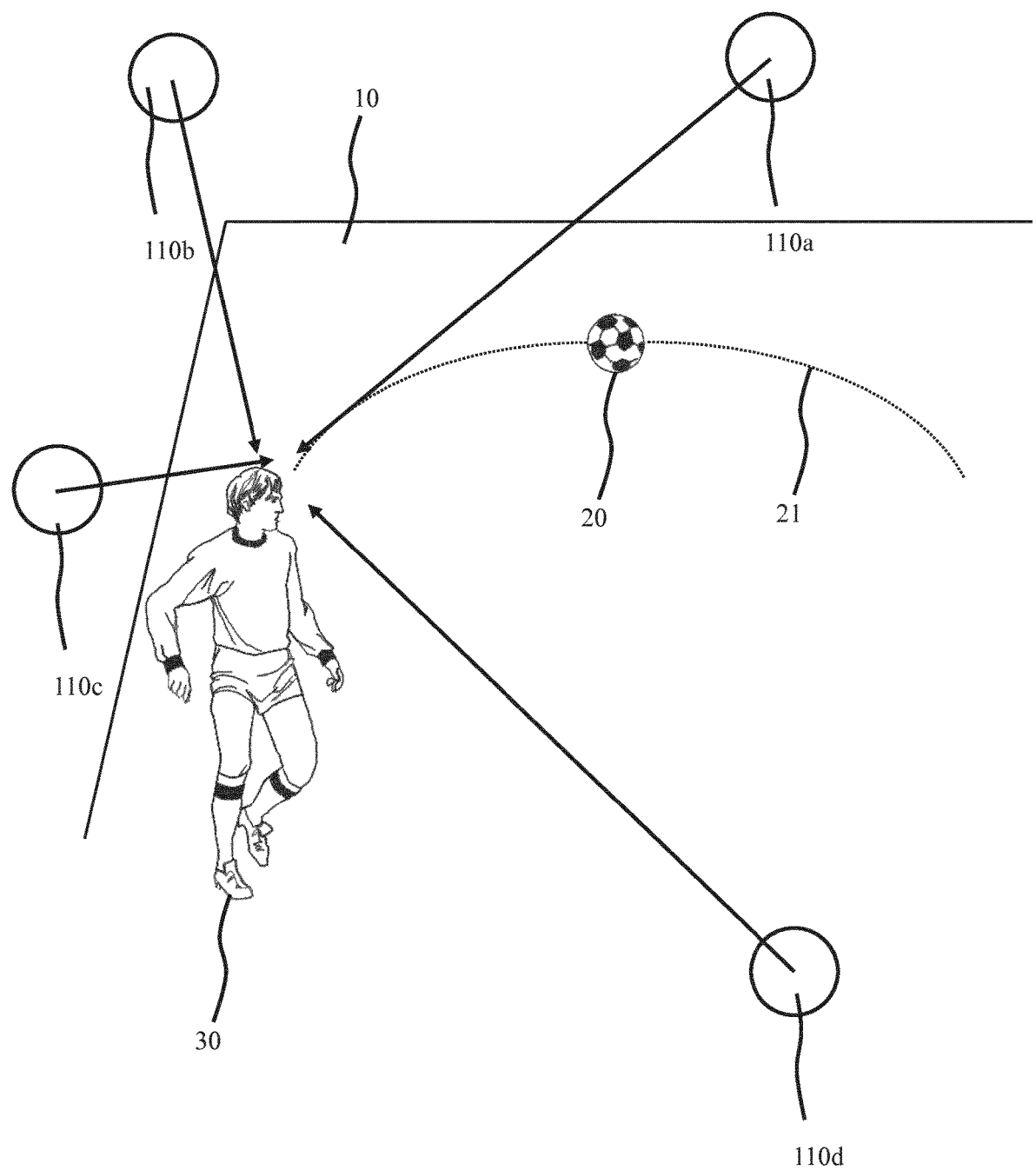
FIG. 3 schematically depicts the potential impact of such a typical aiming arrangement on a player on the pitch of a stadium illuminated by such a stadium lighting system.

However, it is practically impossible for the designer of the light plan to completely rule out a person on the pitch 10 from being exposed to glare. This will be further explained with the aid of FIG. 3, in which a player 30 in a region of the pitch 10 is tracking the movement of an object 20 along a trajectory 21 through the air, here schematically depicted as a ball. As can be seen from the trajectory 21, the object 20 is destined for the region of the pitch 10 in which the player 30 is located, which region may be referred to as the pitch destination region of the object 20. The player 30 may wish to focus on the ball, e.g. to control the ball such as catch it, stop it and pass it on, and so on. Alternatively, in some scenarios a person on the pitch 10 other than a player, e.g. a rules official or the like, may wish to focus on the object 20 to track its movement in order to avoid being hit by the object 20. This for example may be the case in an athletics event where the object 20 is a discus, javelin or the like, where a collision between the object at the person in the pitch destination region may cause injury. As can be seen in FIG. 3, part of the trajectory 21 of the object 20 coincides with the aiming direction of the luminaire 110a such that the player 30 trying to follow the object 20 as it approaches the player may exhibit glare caused by the luminaire 110a, i.e. there exists a risk that the player 30 will be temporarily blinded by the luminaire 110a as the object 20, e.g. the ball, approaches the player. This may cause the player 30 to be unable to properly control the ball, e.g. catch it, which is of course highly undesirable. Alternatively, such glare may lead to a person in the pitch destination region of the object 20 being unable to avoid a collision with the object 20, thereby increasing the risk of personal injury. It is not necessary for the trajectory 21 of the object 20 to coincide with the aiming direction of the luminaire 110a for the player 30 to run the risk of being exposed to glare. Equally, such glare conditions may arise if the angle between the trajectory 21 of the object 20 and the aiming direction of the luminaire 110a is below a defined angle threshold, such that a component of the luminous output of the luminaire 110a along the trajectory 21 can cause such glare.

Embodiments of the present invention are based on the insight that nowadays many stadiums contain object tracking systems that track the trajectory 21 of the object 20 relative to the pitch 10. As schematically depicted in FIG. 1, such object tracking systems may comprise a number of cameras 51, e.g. high-speed cameras, 3-D cameras, and so on, which are connected to an object tracking processor 55 through a communication link 53. Such object tracking systems for example may be used to determine whether an object 20 such as a ball has crossed a line and has gone out of play, e.g. to determine whether a goal or a try has been scored, whether a player in a soccer match was offside, to track a ball flight in a golf match, to determine whether a ball trajectory of a cricket ball would have led to a wicket being hit by the ball and so on. Many more examples will be immediately apparent to the skilled person. It should be understood that such an object tracking system may be implemented in any known manner. As such object tracking systems are well-known per se, the object tracking system will not be described in further detail for the sake of brevity only.

In accordance with embodiments of the present invention, the controller 130 is made responsive to the object tracking system. Specifically, the controller 130 is adapted to receive object tracking information from the object tracking system, e.g. from the object tracking processor 55 and to compare the received object tracking information against the aiming information for the various luminaires 110 as specified in the light plan for the stadium to determine if at least one of the luminaires 110 is aimed in a direction that coincides with the direction of travel of the object 20, i.e. with (a relevant part of such as a downward path of) the object trajectory 21 such that the controller 130 may adjust a dimming level of such a luminaire 110 to reduce the intensity of the luminous output produced by that luminaire.

In the context of the present invention, it should be understood that where reference is made to the direction of travel of the object 20, this is to include object trajectories in which the direction of the object 20 is changing in a predictable manner, i.e. in accordance with the laws of nature, e.g. ballistic trajectories.

In the context of the present invention, it should be understood that where reference is made to a luminaire 110 arranged to generate a luminous output in an aiming direction coinciding with the direction of travel of the object 20, this is intended to cover luminaires having an optical axis coinciding with a relevant part of the object trajectory 21 as well as luminaires that produce a luminous output having an intensity component along the object trajectory 21 above a defined threshold, e.g. an intensity threshold above which there exists an increased risk of a person on the pitch 10 perceiving the luminous output intensity component as glare. For example, a luminaire producing a luminous output having an intensity component along the object trajectory 21 above a defined threshold may be a luminaire having an optical axis under a non-zero angle with the (relevant part of) the object trajectory 21, wherein the value of said angle is below a defined value, e.g. angles of 30° or less, 20° or less, 10° or less or any other suitable angular value.

Embodiments of the present invention provide a control system for the stadium lighting system in which a data storage device 140 storing the light plan of the stadium lighting system is provided, which data storage device 140 is communicatively coupled to the controller 130. Any suitable data storage device may be used for this purpose; for example, the data storage device 140 may be a memory device, e.g. RAM, ROM, PROM, EPROM, EEPROM, Flash memory device and so on, an optical disk, a magnetic disk, a solid state disk or any other suitable data storage device. The data storage device 140 may form an integral part of the controller 130, i.e. may reside within the controller 130, or may be external to the controller 130 and accessible over a data communications link such as a wireless or wired network, e.g. the Internet. In such a scenario, the data storage device 140 for example may form part of a storage area network, network attached storage, cloud storage, and so on. Alternatively, the data communications link may be a P2P link as is well-known per se to the person skilled in the art.

Figure 4:
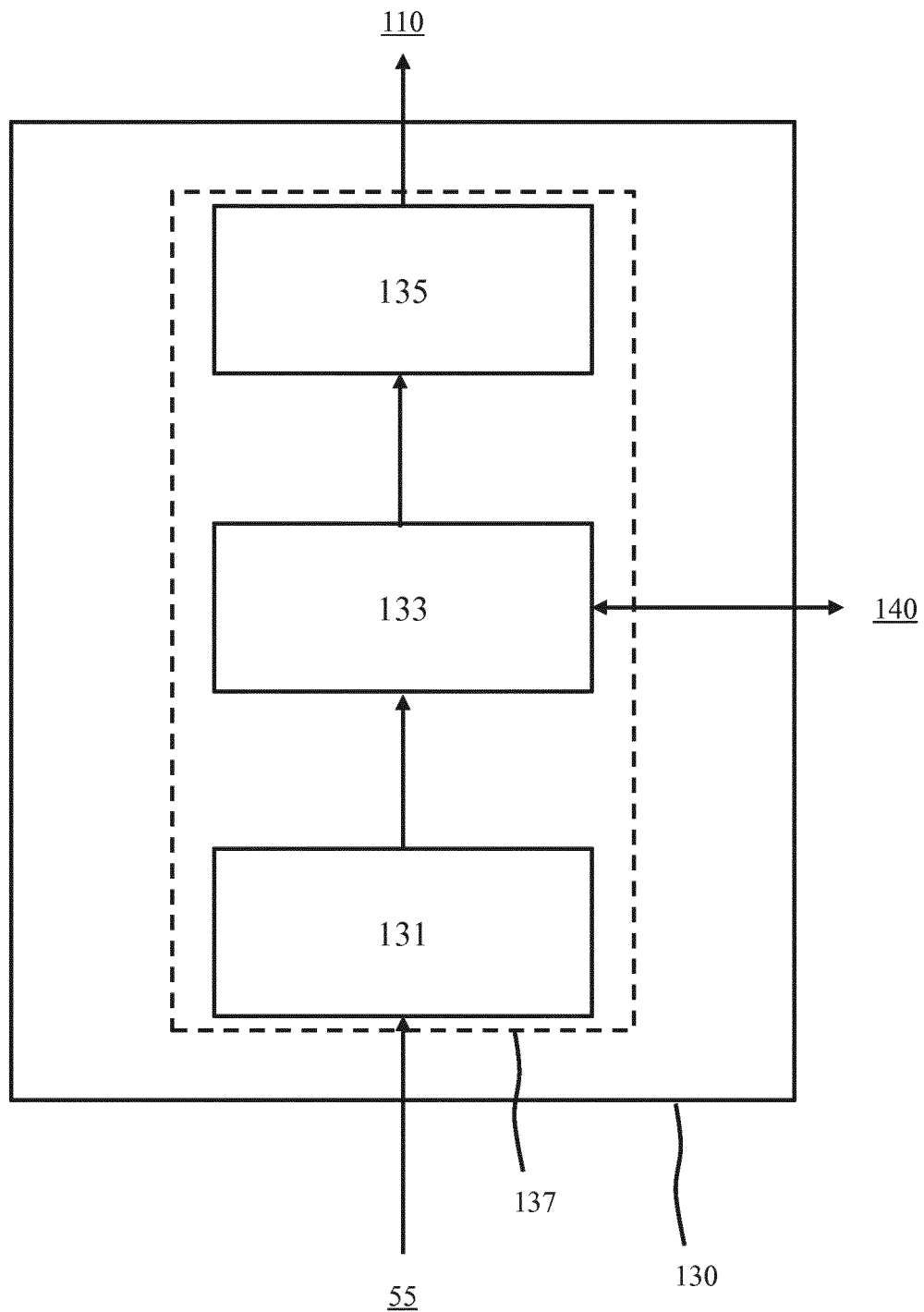
FIG. 4 schematically depicts a block diagram of a control system according to an embodiment.
Figure 5:
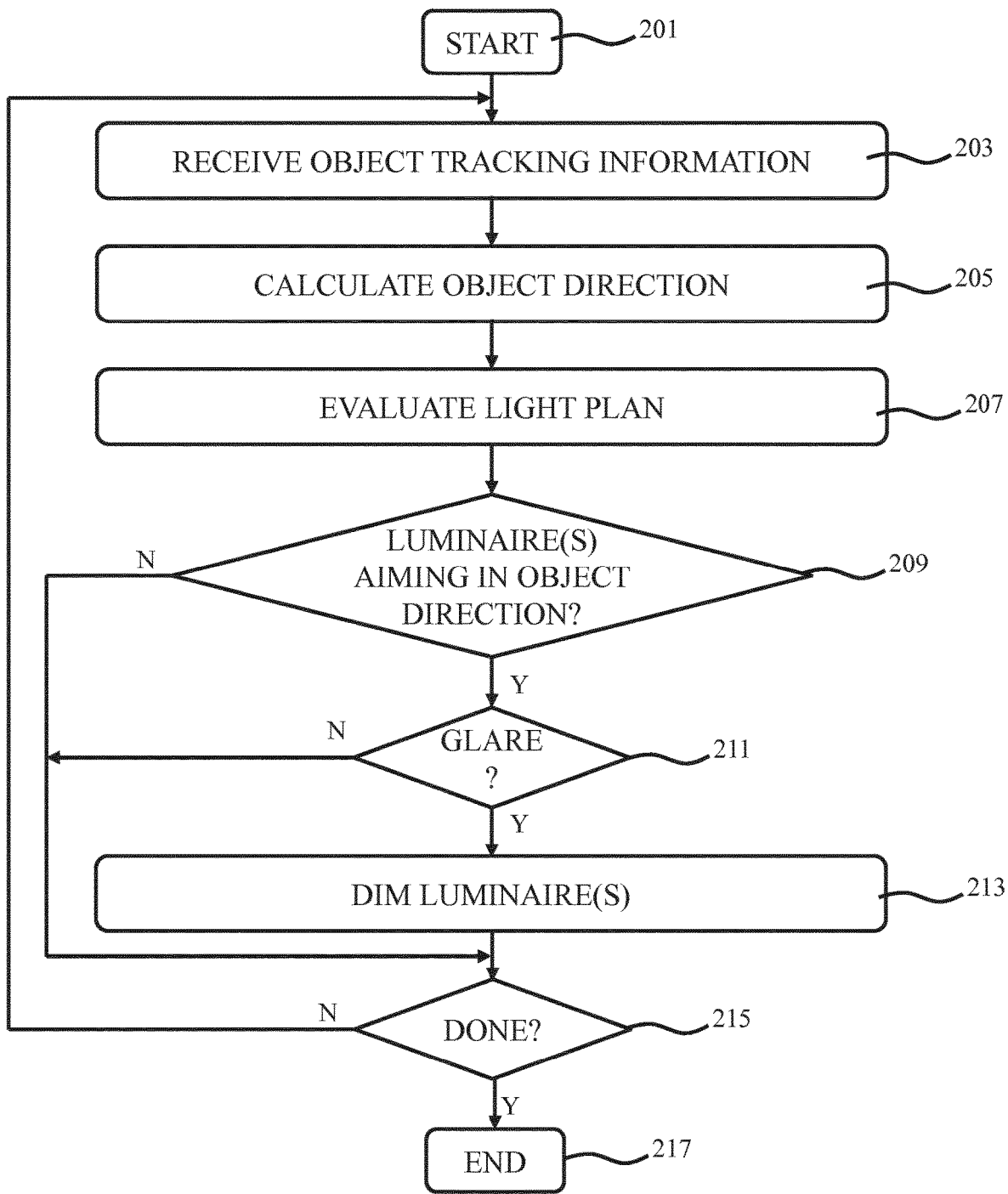
FIG. 5 is a flowchart of a method of controlling a stadium lighting system according to an embodiment.

FIG. 4 schematically depicts an example embodiment of such a control system including the controller 130. In FIG. 4, the controller 130 is depicted to comprise modules 131, 133, 135, which will be explained in further detail below. However it should be understood that such modules may exist at a conceptual level only, e.g. may be implemented by a single processor 137 or a set of processors of the controller 130, e.g. may be implemented by computer program code to be executed by the processor 137 or set of processors of the controller 130. The operation of the control system will now be explained in more detail with the aid of FIG. 5, which depicts a flow chart of a method 200 of controlling a stadium lighting system 100 comprising a plurality of luminaires 110 installed within the stadium to illuminate a pitch 10 within the stadium in accordance with a light plan containing aiming information for each luminaire 110.

The method 200 starts in 201, after which the method proceeds to 203 in which an object trajectory evaluation module 131 of the controller 130 receives object tracking information from the object tracking system, e.g. from the object tracking processor 55. Such object tracking information typically comprises object trajectory 21 information as previously explained. The object trajectory evaluation module 131 is typically arranged to determine a direction of travel for the object 20 relative to the pitch 10 corresponding to step 205 of the method 200, e.g. extract the direction of travel for the object 20 from the object tracking information received from the object tracking system.

The controller 130 may further comprise a light plan evaluation module 133 adapted to access the data storage device 140 to evaluate the aiming information for the respective luminaires 110 of the stadium lighting system 100 as per step 207 of the method 200. The light plan evaluation module 133 may be adapted to receive the determined direction of travel for the object 20 from the object trajectory evaluation module 131 and to compare the direction of travel for the object 20 with the respective aiming directions of the luminaires 110 as obtained from the light plan in the data storage device 140. The light plan evaluation module 133 may be adapted to calculate the respective aiming directions of the luminaires 110 from their mounting positions and aiming targets 12 relative to the pitch 10 as specified in the light plan or alternatively, in case the light plan specifies the aiming direction for the respective luminaires 110, may directly extract the relevant aiming directions from the light plan. In an embodiment, the light plan evaluation module 133 is adapted to build a 3-D model of at least the pitch 10 of the stadium and the space above this pitch and project the respective aiming directions of the luminaires 110 within this 3-D model. The light plan evaluation module 133 may further project the direction of travel of the object 20, e.g. the object trajectory 21, onto this 3-D map and determine whether this direction of travel coincides with at least one aiming direction of the luminaires 110, e.g. if there exists at least one luminaire 110 having an aiming direction coinciding with a relevant part of the object trajectory 21, i.e. a downward part of the object trajectory 21 towards a pitch destination region in which a player 30 may be present as previously explained, as per step 209 of the method 200. The light plan evaluation module 133 may be further adapted to identify further luminaires 110 having an aiming target in the pitch destination region of the object 20.

The controller 130 may further comprise a luminaire control module 135 that may receive luminaire identification information from the light plan evaluation module 133 in case of the light plan evaluation module 133 identifying at least one luminaire 110 having an aiming direction coinciding with a direction of travel of the object 20 and that is adapted to generate the luminaire dimming adjustment signals in accordance with the received luminaire identification information. Such a luminaire identification information at least includes an identification of the one or more luminaires 110 having an aiming direction coinciding with a direction of travel of the object 20 and may further include an identification of one or more further luminaires 110 having an aiming target in a destination pitch region of the object 20, e.g. luminaires 110b-d in case of a luminaire 110a having an aiming direction coinciding with a direction of travel of the object 20 as schematically depicted in FIG. 3. The luminaire control module 135 may generate a dimming level adjustment signal in 213 for the at least one luminaire 110, e.g. luminaire 110a, having an aiming direction coinciding with a direction of travel of the object 20 to reduce the intensity of its luminous output and to provide the identified luminaire(s), e.g. luminaire 110a with this control signal to temporarily reduce the intensity of the luminous output of this luminaire, thereby reducing the risk that a player 30 in the pitch destination region of the object 20 is blinded by this luminaire, e.g. the luminaire 110a.

In an embodiment, the luminaire control module 135 may further generate one or more further dimming level adjustment signals for the one or more further luminaires 110 having an aiming target in a destination pitch region of the object 20, e.g. luminaires 110b-d in case of a luminaire 110a having an aiming direction coinciding with a direction of travel of the object 20, i.e. for the one or more further luminaires having an aiming direction that does not coincide with the direction of travel of the object 20. The luminaire control module 135 may be adapted to temporarily increase the luminous intensity of at least some of the further luminaires, e.g. of the luminaires having an aiming direction above a defined angle, e.g. larger than 60°, 70°, 80°, 90°, or any other suitable angle, to the direction of travel of the object 20, with the further dimming level adjustment signal. In this manner, the luminaire control module 135 may control the lux level in the pitch destination region of the object 20, e.g. to maintain a relatively constant lux level in this region whilst at the same time reducing the risk of the player 30 being blinded. The adjustment of the dimming levels of further luminaires 110 aiming in a direction other than the direction of travel of the object 20 may be extended to luminaires having an aiming target 12 outside the pitch destination region of the object 20, e.g. to maintain a constant lux level across the entirety of the pitch 10.

The luminaire control module 135 may further be adapted to restore the original dimming levels of the luminaires 110 identified by the light plan evaluation module 133, e.g. luminaires 110a-d, after a certain amount of time. For example, the luminaire control module 135 may be adapted to restore the original dimming levels after a defined amount of time or after receiving an indication from the object trajectory evaluation module 131 or from the light plan evaluation module 133 that the object 20 has changed direction, such that the risk of the player 30 being blinded by the previously identified luminaire 110a no longer exists. The luminaire control module 135 may restore the original dimming levels of the previously adjusted luminaires 110 in any suitable manner, as will be immediately apparent to the skilled person in the art.

In an embodiment, the light plan evaluation module 133 may further assess in 211 if a risk of glare exists in the pitch destination region for the object 20 as extrapolated from the object trajectory 21. For example, the light plan may include a light map highlighting pitch areas 11 of particularly high luminous intensity, which area therefore are glare hotspots. Alternatively, the light plan evaluation module 133 may calculate this light map from the information stored in the light plan. The light plan evaluation module 133 may determine if the pitch destination region for the object 20 coincides with such a glare hotspot and only pass on luminaire identification information to the luminaire control module 135 if this is the case.

As indicated by 215 in the method 200, the controller 130 typically continues with controlling the luminaires 110 in the above described manner, e.g. by reverting back to 203 after a negative assessment 209 of the existence of one or more luminaires aiming in the same direction as the direction of travel of the object 20, after a negative assessment 211 of the pitch destination region for the object 20 coinciding with a glare hotspot, or after the adjustment of the dimming levels 213 of one or more of the luminaires 110 as previously explained until the method 200 terminates in 217, e.g. after a sports event on the pitch 10 has ended.

Figure 6:
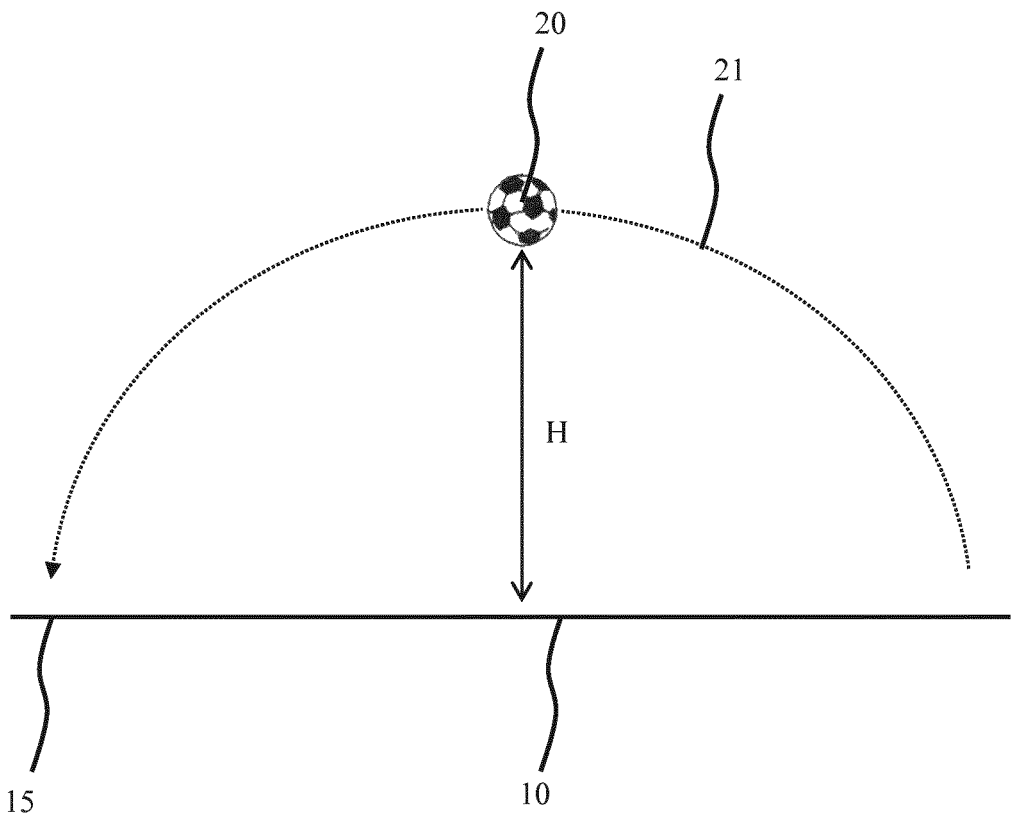
FIG. 6 schematically depicts an object trajectory across the pitch that may be evaluated by such a control system.
Figure 7:
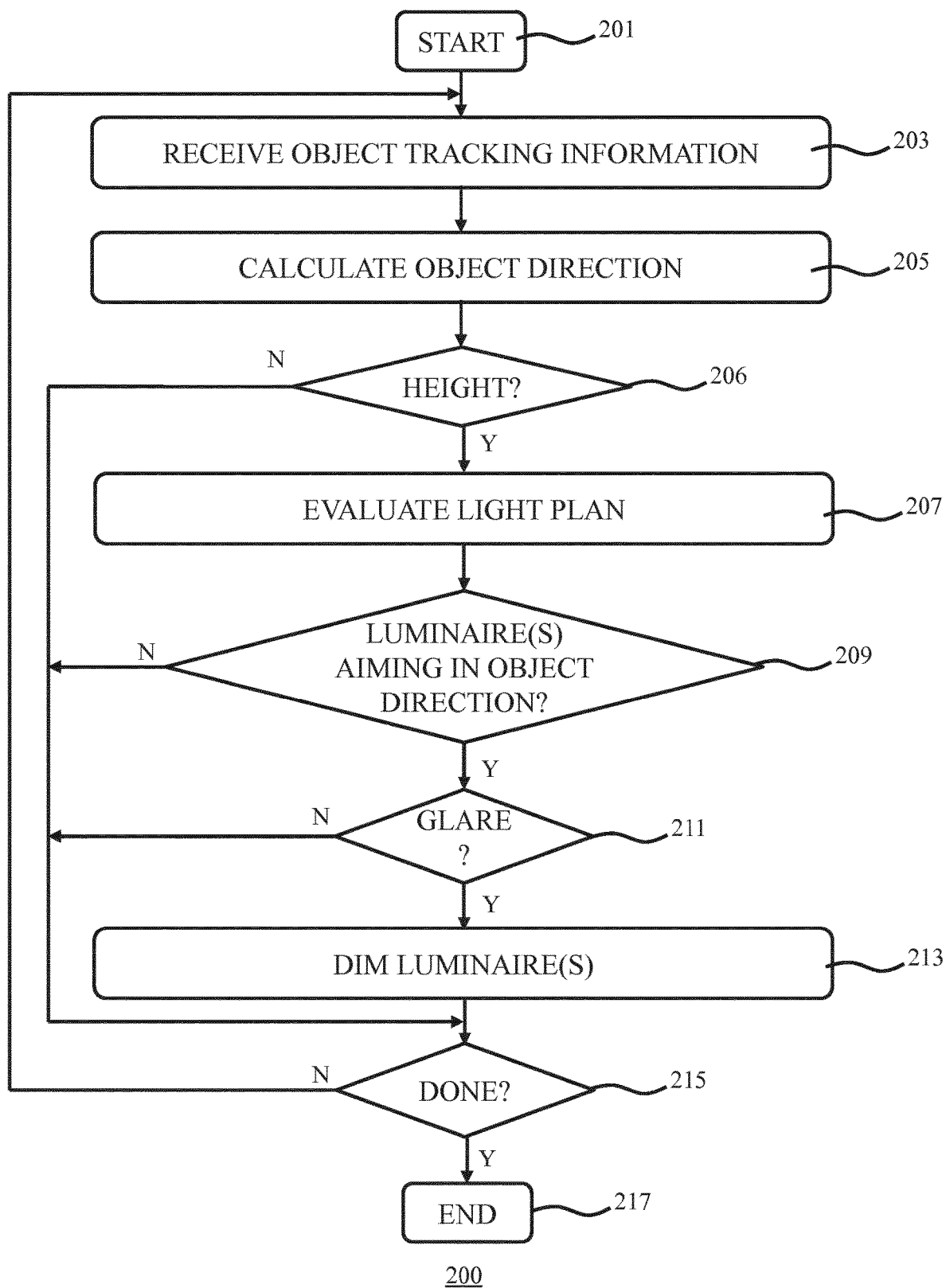
FIG. 7 is a flowchart of a method of controlling a stadium lighting system according to another embodiment.

The operation of the controller 130 and the method 200 may be refined by taking height information for the object 20 relative to the pitch 10 as provided by the object tracking system, e.g. the object tracking processor 55, into account. This is schematically depicted in FIG. 6, where the height H of the object 20 as provided by the as provided by the object tracking system may be used to control the operation of the control system including the controller 130 in accordance with the method 200 of controlling a stadium lighting system 100 comprising a plurality of luminaires 110 installed within the stadium to illuminate a pitch 10 within the stadium in accordance with a light plan containing aiming information for each luminaire 110 as depicted by the flow chart of FIG. 7.

In this embodiment, the controller 130, e.g. the object trajectory evaluation module 131, may determine in 206 if the (projected) maximum height of the object 20 relative to the pitch 10 exceeds a defined height threshold. Such a height threshold for example may identify the minimum height of travel for the object 20 at which there exists a risk of glare for a player 30 on the pitch 10. Such a height threshold may be defined based on the minimum installation height of the luminaires 110 and the distance of the luminaires 110 from the pitch 10 as will be immediately apparent to the skilled person. If the maximum height of the object 20 does not exceed this height threshold, there exists no risk of glare such that further processing of the object tracking information is not required, such that the method 200 may revert back to 203 or terminate in 217 as previously explained. Only if the (projected) maximum height of the object 20 relative to the pitch 10 exceeds this height threshold may the method 200 proceeds to 207 in which the determined direction of travel for the object 20 is passed onto the light plan evaluation module 133 as previously explained.

In another embodiment, the height information may be used to predict the pitch destination region of the object 20, for example if the height H of the object 20 relative to the pitch 10 exceeds a further height threshold. In such a scenario, there may be a negligible risk that the object 20 is intercepted during its flight, such that there exists a high likelihood that the object 20 will eventually arrive in the pitch destination region. The object trajectory 21 information as the received from the object tracking system may be used by the control system to extrapolate a time of arrival of the object 20 in the pitch destination region extrapolated from the object trajectory 21, which estimated time of arrival may be used to generate the various dimming level adjustment signals with the luminaire control module 135 at a point in time in accordance with the estimated time of arrival, e.g. just before the estimated time of arrival. This for example may be used in a soccer match where a shot over a greater distance is travelling towards a goalkeeper such that upon the ball reaching the goalkeeper, one or more luminaires 110 in the direction of travel of the ball may be dimmed to aid the goalkeeper in clearly seeing the ball when trying to control it. Similar scenarios include a fielder in a cricket match trying to catch a looping shot, e.g. close to the boundary rope, a fielder in a baseball match trying to catch an airborne baseball, e.g. close to the fence, and so on.

At this point, it is noted that although the control system and method according to embodiments of the present invention may be deployed with a stadium lighting system 100 including any type of luminaires 110, in particularly advantageous embodiments the luminaires 110 are dimmable LED luminaires, as LED luminaires are particularly suitable for use with such a control system and method because of their short response times, e.g. 50 ms or less, to dimming level adjustment control signals.

Aspects of the present invention may be embodied as a control system for controlling the luminaires 110 of a stadium lighting system 100, a stadium lighting system 100 including such a control system and a method 200 or computer program product for controlling a stadium lighting system 100 comprising a plurality of luminaires 110 installed within the stadium to illuminate a pitch 10 within the stadium in accordance with a light plan containing aiming information for each luminaire 110. Aspects of the present invention may take the form of a computer program product embodied in one or more computer-readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Such a system, apparatus or device may be accessible over any suitable network connection; for instance, the system, apparatus or device may be accessible over a network for retrieval of the computer readable program code over the network. Such a network may for instance be the Internet, a mobile communications network or the like.

More specific examples (a non-exhaustive list) of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present application, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out the methods of the present invention by execution on the processor 137 may be written in any combination of one or more programming languages, including an object oriented programming language such as Java, Smalltalk, C++ or the like and conventional procedural programming languages, such as the "C" programming language or similar programming languages. The program code may execute entirely on the processor 137 as a stand-alone software package, e.g. an app, or may be executed partly on the processor 137 and partly on a remote server. In the latter scenario, the remote server may be connected to the controller 130 through any type of network, including a local area network (LAN) or a wide area network (WAN), or the connection may be made to an external computer, e.g. through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions to be executed in whole or in part on the processor 137 of the control system of the stadium lighting system 100, such that the instructions create means for implementing the functions/acts specified in the flowchart and/or block diagram block or blocks. These computer program instructions may also be stored in a computer-readable medium that can direct the controller 130 of the control system to function in a particular manner.

The computer program instructions may be loaded onto the processor 137 to cause a series of operational steps to be performed on the processor 137 to produce a computer-implemented process such that the instructions which execute on the processor 137 provide processes for implementing the functions/acts specified in the flowchart and/or block diagram block or blocks. The computer program product may form part of a control system for controlling a stadium lighting system 100, e.g. may be installed on the control system, e.g. may reside in the data storage device 140.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A control system for a stadium lighting system comprising a plurality of luminaires installed within the stadium to illuminate a pitch within the stadium in accordance with a light plan containing aiming information for each luminaire, the control system comprising:
   a data storage device storing the light plan;
   a controller communicatively coupled to the data storage device, the controller being responsive to object tracking information for an object travelling across the pitch, wherein the controller is adapted to:
   determine a direction of travel of the object from the object tracking information;
   evaluate the aiming information for each luminaire to identify if at least one luminaire is arranged to generate a luminous output in an aiming direction coinciding with said direction of travel, by determining an angle between the direction of travel and an aiming direction of the luminaire and compare the determined angle against an angle threshold; and
   generate a dimming level adjustment signal for the at least one identified luminaire to reduce the intensity of said luminous output.

2. The control system of claim 1, wherein said angle threshold comprises an angular value of 30 degrees or less.

3. The control system of claim 1, wherein the controller is adapted to:
   predict a pitch destination region for the object from the object tracking information; and
   evaluate the aiming information for each luminaire to identify at least one luminaire arranged to generate a luminous output in an aiming direction coinciding with said direction of travel and having an aiming target in a pitch location in the pitch destination region.

4. The control system of claim 3, wherein the controller is adapted to predict the pitch destination region in response to determining that the height (H) of the object relative to the pitch exceeds a defined further height threshold, said further height threshold being larger than the height threshold.

5. The control system of claim 3, wherein the controller is adapted to:
   predict a time of arrival of the object in the pitch destination region; and
   generate the dimming level adjustment signal for the at least one identified luminaire in accordance with the predicted time of arrival.

6. The control system of claim 3, wherein the controller is further adapted to:
   evaluate the aiming information for each luminaire to identify at least one further luminaire arranged to generate a luminous output in an aiming direction different to said direction of travel and having an aiming target 424 in a pitch location in the pitch destination region; and
   generate a further dimming level adjustment signal for the at least one identified further luminaire.

7. The control system of claim 3, wherein the controller is further adapted to:
   estimate an amount of glare for said pitch destination region from the aiming information in said light plan; and
   generate the dimming level adjustment signal for the at least one identified luminaire if said estimated amount of glare exceeds a defined glare threshold.

8. A stadium lighting system comprising:
   a plurality of luminaires for mounting in a stadium in accordance with a light plan containing aiming information for each luminaire; and
   the control system of claim 1 arranged to control said luminaires.

9. The stadium lighting system of claim 8, wherein the luminaires are LED luminaires.

10. A method of controlling a stadium lighting system comprising a plurality of luminaires installed within the stadium to illuminate a pitch within the stadium in accordance with a light plan containing aiming information for each luminaire, the method comprising:

receiving object tracking information for an object travelling across the pitch;

determining a direction of travel of the object from the object tracking information;

accessing the light plan to evaluate the aiming information for each luminaire and identify if at least one luminaire is arranged to generate a luminous output in an aiming direction coinciding with said direction of travel; and generating a dimming level adjustment signal for the at least one identified luminaire to reduce the intensity of said luminous output.

11. The method of claim 10, further comprising:

predicting a target pitch destination region for the object from the object tracking information; and evaluate the aiming information for each luminaire to identify at least one luminaire arranged to generate a luminous output in an aiming direction coinciding with said direction of travel and having an aiming target in a pitch location in the target pitch destination region.

12. The method of claim 11, further comprising:

predicting a time of arrival of the object in the target pitch destination region; and generating the dimming level adjustment signal for the at least one identified luminaire in accordance with the predicted time of arrival.

13. The method of claim 11, further comprising:

evaluating the aiming information for each luminaire to identify at least one further luminaire arranged to generate a luminous output in an aiming direction different to said direction of travel and having an aiming target in a pitch location in the target pitch destination region; and generating a further dimming level adjustment signal for the at least one identified further luminaire.

14. The method of claim 11, further comprising:

estimating an amount of glare for said pitch destination region from the aiming information in said light plan; and generating the dimming level adjustment signal for the at least one identified luminaire if said estimated amount of glare exceeds a defined glare threshold.

15. A non-transitory computer readable storage medium having stored therein instruction for causing a processing unit to execute the method of claim 10.

* * * * *